United States Patent
Stephens (10) Patent No.: US 7,207,682 B2
(45) Date of Patent: Apr. 24, 2007

(54) KALEIDOSCOPE DEVICES

(76) Inventor: Peter Stephens, 753 39th Ave., San Francisco, CA (US) 94121

(*) Notice: Subject to any disclaimer, the term of this patent is extended or adjusted under 35 U.S.C. 154(b) by 0 days.

(21) Appl. No.: 10/891,906

(22) Filed: Jul. 15, 2004

(65) Prior Publication Data

US 2005/0041141 A1 Feb. 24, 2005

Related U.S. Application Data

(60) Provisional application No. 60/560,985, filed on Apr. 12, 2004, provisional application No. 60/486,903, filed on Jul. 15, 2003, provisional application No. 60/486,904, filed on Jul. 15, 2003.

(51) Int. Cl.
*G02B 27/08* (2006.01)
(52) U.S. Cl. .................... 359/616; 359/617
(58) Field of Classification Search ............. 359/616, 359/617; 353/1, 2; 472/63
See application file for complete search history.

(56) References Cited

U.S. PATENT DOCUMENTS

| | | | | |
|---|---|---|---|---|
| 3,809,879 A * | 5/1974 | Gonzalez | ................ | 359/617 |
| 4,172,629 A * | 10/1979 | Allen | .................... | 359/616 |
| 5,172,270 A * | 12/1992 | Peiperl | .................. | 359/617 |
| 6,332,686 B1* | 12/2001 | Yoda | ..................... | 359/617 |
| 6,644,819 B2* | 11/2003 | Nelson | ................... | 359/616 |
| 2003/0214259 A9* | 11/2003 | Dowling et al. | ........ | 315/312 |
| 2004/0032662 A1* | 2/2004 | Hattori et al. | .......... | 359/616 |

* cited by examiner

*Primary Examiner*—Christopher Mahoney
(74) *Attorney, Agent, or Firm*—Howard C. Miskin, Esq.; Gloria Tsui-Yip, Esq.

(57) ABSTRACT

A portable kaleidoscope device for viewing kaleidoscopic images of at least one imaging object is provided with a viewing assembly for viewing the imaging object, a fill chamber assembly, a main body connecting said viewing assembly to said fill chamber assembly, and illumination source or black light-generating illumination source disposed in the device for illuminating the imaging object with light of a selected wavelength.

29 Claims, 11 Drawing Sheets

KALEIDOSCOPE DEVICES

CROSS-REFERENCE TO RELATED APPLICATIONS

The benefit of the priority of prior U.S. Provisional Patent Applications Ser. Nos. 60/486,903, filed Jul. 15, 2003; 60/486,904, filed Jul. 15, 2003; and 60/560,985, filed Apr. 12, 2004, is claimed. This application is a continuation in part of prior U.S. Provisional Patent Applications Ser. Nos. 60/486,903 and 60/486,904, filed Jul. 15, 2003, and 60/560, 985, filed Apr. 12, 2004, the disclosure of each of which is hereby incorporated by reference.

BACKGROUND OF THE INVENTION

The present invention relates to kaleidoscope devices.

Previously, the possible sources of light for illuminating the imaging objects, or "fill" of portable or handheld kaleidoscopes were limited. Incandescent and fluorescent sources were not amenable to such use because of size, heat emission or electrical requirements.

Ultraviolet illumination encompasses light having wavelengths of 4 to 400 nanometers. The longer wavelengths of the ultraviolet light spectrum are called "black light," which has wavelengths slightly shorter than those that are normally visible and are generally safe for human viewing. Black light appears as a deep blue light because only a portion of the light has long enough wavelengths to be visible to human. For the purpose of this invention, blue, violet, near ultra violet or blue black light illumination is simply called black light. An example of a shorter wavelength in the ultraviolet light spectrum is germicidal ultraviolet light that emits a much shorter wavelength that is dangerous to human skin and eyes.

The barely visible and invisible black light energizes objects with black light responsive pigments and/or dyes, such as fluorescent and/or phosphorescent pigments, which then re-emit the light in visible colors. This results in the object appearing to have an independent glow or source of light, as if internally lit. Once a black light phosphorescent responsive object has been exposed to black light, it retains the glowing effect for a short period of time after the removal of the black light. Black lights have been used as a source of illumination in theatrical productions, amusement park rides and home use for illuminating art covered with fluorescent and/or phosphorescent paint, and for general atmospheric effects for numerous years. Fluorescent objects will absorb the UV light and immediately emit in the visible light range of that particular fluorescence visible color. Phosphorescent objects will continue to "glow" after the LED light source is turned off creating a "ghostly" image.

SUMMARY OF THE INVENTION

A portable kaleidoscope device of the present invention for viewing kaleidoscopic images of at least one imaging object comprises a viewing assembly for viewing the imaging object, a fill chamber assembly, a main body connecting the viewing assembly and the fill chamber assembly and lighting means disposed in the device for illuminating the imaging objects with light of a selected wavelength.

Alternatively, a kaleidoscope device of the present invention for viewing kaleidoscopic images of at least one imaging object may also comprise a viewing assembly for viewing the imaging object, a fill chamber assembly, a main body connecting the viewing assembly and the fill chamber assembly and a black light-generating means disposed in the device for illuminating the imaging object with light of a selected wavelength.

DESCRIPTION OF THE PREFERRED EMBODIMENTS

A portable kaleidoscope device of the present invention for viewing kaleidoscopic images of at least one imaging object comprises a viewing assembly for viewing the imaging object, a fill chamber assembly, a main body connecting the viewing assembly and the fill chamber assembly and lighting means disposed in the device for illuminating the imaging objects with light of a selected wavelength.

Ultraviolet (UV) illumination, in particular, is desirable for kaleidoscope illumination because of the interesting visual effects it produces. The advent of blue and violet light emitting diodes (LEDs) and the general increase in light output of all LEDs makes practicable the illumination of the imaging objects or particles (the fill) of handheld kaleidoscopes by means of these new LEDs. This illumination of the imaging objects or particles is in contrast to the use of LEDs as the particles themselves, which has been common to the art for numerous years in the form of low output LED arrays that are directly viewed as a pattern that is multiplied by the intervening mirror chamber common to kaleidoscopes. Instead, in the present invention the LEDs serve as illuminators of traditional fill particles such as plastic beads, gems, and patterned flat stock comprised of non-fluorescent materials as well as fluorescent and/or phosphorescent imaging particles comprising a less traditional fill.

The illumination of a fluorescent or phosphorescent fill by means of a single UV LED or blue LED is novel and striking in and of itself, creating a "black light effect." While the UV LED would seem to be the superior choice, in fact, blue LED does the job almost as well and has the added advantage of augmenting fluorescent blue fill particles with actual reflected blue as well. The fill being comprised of fluorescent materials will seem to glow from within.

A transparent plastic barrier doped with or containing ultra violet blocking agents, a focusing lens for instance, can be used to block the UV light from eye contact while still energizing the fluorescent and/or phosphorescent structures to emit visible light which, not being blocked by the UV blocking agents, will appear with less eye strain. Also, while black light has been used for illuminating all sorts of fluorescent objects with external UV sources in the form of large fluorescent tubes, an easily handheld, portable, kaleidoscope of the present invention with built-in illumination means with practical battery life is only possible with the advent of bright LEDs including UV and blue LEDs. In addition, it has been found in the present invention that a truly portable UV-illuminated kaleidoscope can be created without an internal LED illumination source by simply filtering ambient white light so that only deep blue light or black light enters the fill chamber because this light will stimulate the desired fluorescent and/or phosphorescent emissions from the fill particles. Black light has had a purely utilitarian function from its beginnings for lighting up certain areas to display objects isolated and distinct from the black light source itself.

With regard to the present invention, the advent of miniature solid state sequencing drivers for LEDs also enables the illumination source to include multicolor and sequential illumination of the fill particles. This yields surprising light show effects especially in combination with fluorescent and/or phosphorescent fill objects which will not emit light when lit by a red LED, except for red fluorescent fill objects, which will appear red; will appear somewhat multicolored when lit by a green LED, and fully multicolored when lit by a blue or UV LED. With the addition of non-fluorescence fill objects, i.e., fill objects that are comprised of non-fluorescing colors, which behave differently under changing color illumination, increases the complexity of the kaleidoscopic image produced by the present invention.

Microelectronic drivers can run sequences or selectively lit specific LEDs of a given multiple LED array, taking full advantage of LED illumination. The LEDs, driver and the batteries are so small that elaborate portable self-illuminated kaleidoscopes are practical. Since an array that includes at least one UV LED or blue LED can be selectively chosen to be on and illuminate a fluorescent and/or phosphorescent fill, the single UV/blue LED kaleidoscope is presented as a special case, and all other embodiment presented here employ multiple LEDs.

In particular, the use of a set of LEDs, such as an RGB array (comprising at least one red, one green, and one blue LED), allows for many interesting and novel visual effects on the fill particles which when multiplied by the mirror system create kaleidoscope images that are new, quite novel, and startling.

The use of a multi-color LED array in which each LED is controllable to create various combinations and blinking sequences enable numerous color effects. The LED array will produce a white light illumination of the fill particles when all of them are on at the same time. Of course, if that were the only effect desired then one could substitute a single white LED. With only the red on, then a red monochrome image will result. With only blue on, then (in combination with fluorescent fill particles) blue light will energize the red through blue fluorescent colored fill particles to emit in their own colors. So, instead of a blue monochrome, the result is a multi-colored "black light affect." When the array is in slow fade or blinking mode in which each LED is briefly on one at a time then the kaleidoscope image seems to change dramatically even when the fill particles have not been moved. With a non-fluorescent fill, even there the image changes dramatically under a color changing illumination. If the fill is fluorescent, then the changing colored illumination changes the fill image in surprising ways. When blue is on then in a non-fluorescing fill the image will be simply monochrome blue, but with fluorescent fill present then multiple colors of the fill still remain, for instance. With the LEDs in a fast blinking mode, on the order of 2–24 blinks per second, the optical cascading effects that occur are startlingly psychedelic. When the fill is a mix of fluorescent and phosphorescent particles then an even more interesting mix occurs since the phosphorescent particles continue to glow and thus blink less than the fluorescent particles. In addition, when the LEDs are turned off, the phosphorescent particles will continue to glow creating a "ghostly" kaleidoscopic image.

It is an additional purpose of the present invention to create a kaleidoscope that is more open-ended than traditional kaleidoscope by means of being able to optionally dispense with the traditional fill chamber and allow the kaleidoscope to come in contact with ordinary flat stock such as magazine covers, photographs, psychedelic posters, and other ready to hand images to turn these into traditional multiplexed kaleidoscope images that change as one slides the kaleidoscope over them. Since the illumination comes from within the kaleidoscope, then the ready to hand images are well illuminated even with the kaleidoscope end flush with the flat stock. A traditional kaleidoscope would block out all light from this image source unless the kaleidoscope was held so far away from the image source that the image would lose coherent symmetry. In addition, the LED array having several configuration options from single color, to color mix, to several sequential blinking options gives these mundane images, already elevated by the mirror multiplexing, a startling richness and unexpected novelty.

Since the essence of the invention is about the light source in the kaleidoscope, in essence, a fill chamber can be attached to any of the kaleidoscopes herein described. In addition, the kaleidoscopes describe several locations for LEDs and LED arrays. In practice, a kaleidoscope could have all these locations with a selector to choose which location would be active, or the kaleidoscope may incorporate only one such location. Any one of the locations will suffice though the visual effect will be subtly different.

In order to fully describe the invention, several basic embodiments of the invention are described. This relates to LED placement and some consequences of this to utility and quality of image. In all cases, the location of the illumination means may be occupied by a single LED or by an array. The array for simplicity sake is usually a three LED array of red, green, and blue. Of course, this could be expanded to include a full spectrum of LEDs including, white, yellow, orange, violet, ultraviolet, as well as the red, green, and blue. RGB can of course yield white and all the other colors depending on which combination of them is on.

The term "black light" as used herein with reference to the illumination of objects in the kaleidoscope of the present invention is intended to mean light that includes near ultra violet light. Black light may also, optionally, include visible blue and/or visible violet light in addition to near ultra violet light. Since the late sixties and the use of near ultra violet fluorescent lights or "black lights" to illuminate rooms and ultra violet ("UV") light sensitive posters, there has been developed a certain black light aesthetic, that is, an aesthetic that is recognizable by the characteristic glow of a black light poster under UV illumination. The invention herein not only brings this effect to kaleidoscope imagery, it does so with or without the need for a UV light source per se by means of filtering normal ambient light to provide ultra violet light illumination.

In a first embodiment of the kaleidoscope of the present invention, and as shown for illustration in FIGS. 1–4, the kaleidoscope employs a single LED or an array of three LEDs (see FIG. 5) that are located near the eye piece at the anterior end of the kaleidoscope and beam directly down the mirror chamber to the fill chamber in a head on illumination of the fill. (The term "kaleidoscope device" or "kaleidoscope" as used herein is meant to include kaleidoscopes, kaleidoscope projectors, and teleidoscopes.) A single UV or blue LED in combination with fluorescent fill will create the black light effect, but with a three LED option then one LED could be blue and two could be UV and then the black light effect would be richer in blue when all three LEDs are on. And, of course, if the three LEDs are RGB, when a single blue is on then the black light effect is present, and with RGB colored sequencing on, then the fill goes through kinetic transformations as the color of illumination changes.

The LED-illuminated kaleidoscope 1 of the present invention comprises an anterior viewing and illumination assembly 2, a main body 3, and a rotatable and refillable fill chamber assembly 4. The main body 3 is comprised of a main body tube 5 with three identical mirrors 6 press-fit into the tube to form a three-sided mirror chamber 7. The posterior ends of the mirrors are framed by the framing cap 8 press-fit to the main body tube by means of a framing cap wall 9 and a border edge 10 preventing the mirrors 6 from sliding down. The fill chamber assembly 4 is comprised of a rotatable barrel 11 retained by flange 13 and opaque base cap 12. The base cap has several mixing nubbins 13 that aid in mixing the fill particles 15. The fill chamber 14 contains fluorescent and/or phosphorescent particles 15 and is captured by the transparent conic cover plate 16. This conic shape deflects reflections of the image of the anterior LED 23 thus minimizing the LED reflections that would confuse the underlying image of the illuminated fill particles 15. The base cap 12 is press fit to the rotatable barrel 11 and can be removed by prying at the groove 17. The cover plate is then tapped out and different fill particles 15 may be entered. (It should be noted that the fill 15 in this case is in an air medium. It could also be suspended in a transparent liquid. Fill particles may also lean up into the mirror chamber 7 if there is no barrier, such as the conic cover plate 16, to having the fill 15 entering the mirror chamber 7. This allows for a more interesting image. Added effects can occur by tilting the bottom end upward which causes fill 15 to flow into the mirror chamber 7 itself. Tilting back down then causes this fill 15 to move downward in interesting ways.)

Figure 2:
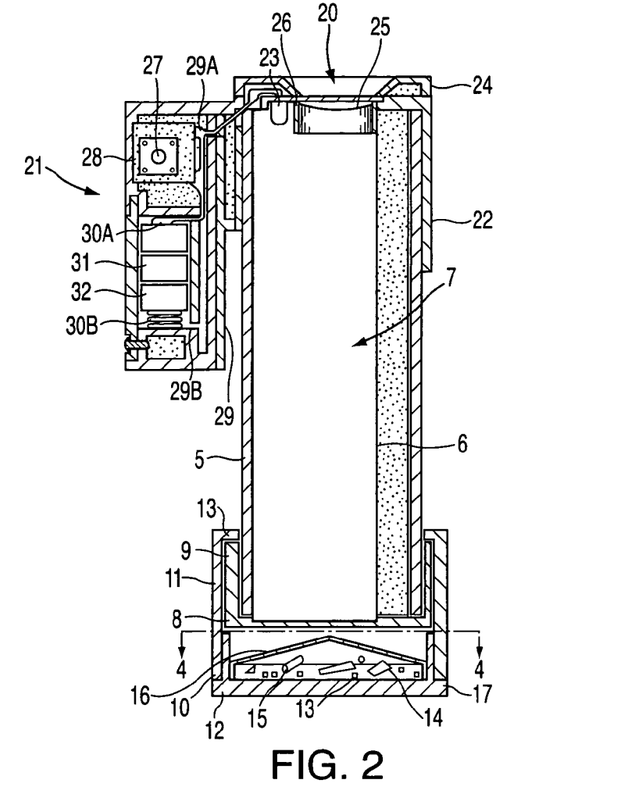
FIG. 2 is a longitudinal elevation view, in vertical section, of the kaleidoscope of FIG. 1.
Figure 3:
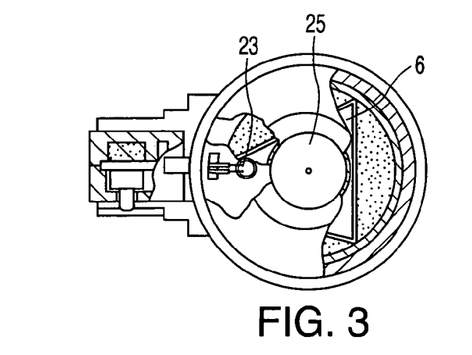
FIG. 3 is a partial cross sectional top plan view of the kaleidoscope of FIG. 2.
Figure 4:
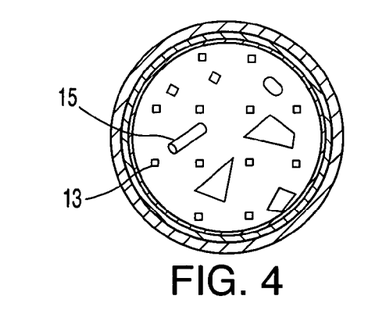
FIG. 4 is a cross sectional view, taken along line 4—4 in FIG. 2, of the fill chamber of the kaleidoscope of FIG. 2.
Figure 5:
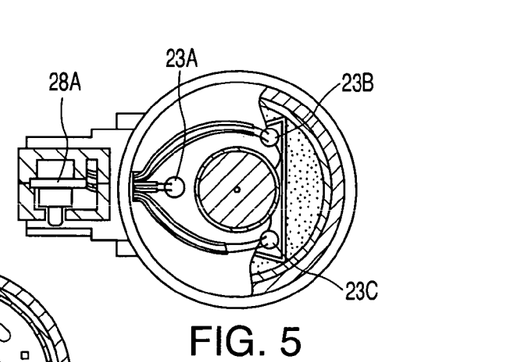
FIG. 5 is another partial cross sectional top plan view of a kaleidoscope similar to FIG. 2.

The anterior viewing and illumination assembly 2 is comprised of view port 20 for looking down through the kaleidoscope at the multiplexed image of the fill particles 15. The operating handle 21 is mounted to an upper cylindrical end cap 22 that is press-fit to the main body 3. A downwardly pointed UV or blue LED 23 is mounted to this cap and is captured and covered by an eyepiece cap 24 that also captures the positive focusing lens 25. The cylindrical end cap 22 also is comprised of a cylindrical light mask 26 that surrounds the lens 25 and prevents lateral LED light wash from hitting the eye. Alternately, FIG. 5 illustrates the mounting of three LEDs 23a, 23b, and 23c. These LEDs may be all UV LEDs or a combination of two UV LEDs with the remaining one being a blue LED. This adds a rich blue to the illuminated scene while creating a maximum fluorescent and/or phosphorescent effect. Another possible combination is one in which there is one red LED, one green LED, and one blue LED. This combination allows for numerous color effects.

The operating handle 21 is comprised of a button switch 27 that is mounted to an LED driver and/or sequencing chip 28. The LED 23 is connected to the chip 28 and battery contacts by means of wires 29a and 29b. The battery contacts 30a and 30b connect the DC power source comprised of three 1.4–1.5 volts batteries 31 for a combined operating voltage of 4.2–4.5 volts DC. The battery cap 32 retains the batteries. The button switch is on only when it is depressed, and off when not pressed. This prevents the kaleidoscope from being left on. In the simplest case of a single LED 23 then the LED driver chip 28 need be nothing more than the necessary resistor for the LED 23. However, the LED driver chip 28 may also provide a blinking function to the single LED 23, and even a number of differently blinking rates. In this case pressing down the button switch 27 chooses the next function as it turns on the kaleidoscope. Thus, depressing the button 27 will choose a continuously on mode of the LED 23 until the button 27 is released. Depressing the button 27 again will choose a slow blinking mode for the LED 23 until the button 27 is released. Depressing the button 27 again will choose a fast blinking mode for the LED 23 and so on through the possible functions afforded on the chip 28. In the case of the three LED configuration of FIG. 5 then the LED driver chip 28 can have many interesting functional configurations including slow fade and fast blink through all the colors of the rainbow when the LEDs 23a, 23b and 23c are red, green, and blue, respectively, for instance.

In a second embodiment of the kaleidoscope of the present invention, and as shown for illustration in FIGS. 6–12, the kaleidoscope is one in which an RGB array is placed along an edge of the mirror chamber somewhere below the eye piece and above the fill chamber transparent cover plate. The LEDs illuminate the fill chamber with a diagonal light. Reflections of the illumination source in the transparent fill chamber cover plate border the viewing area and enhance the central kaleidoscopic image.

Figures 6, 7, 10:
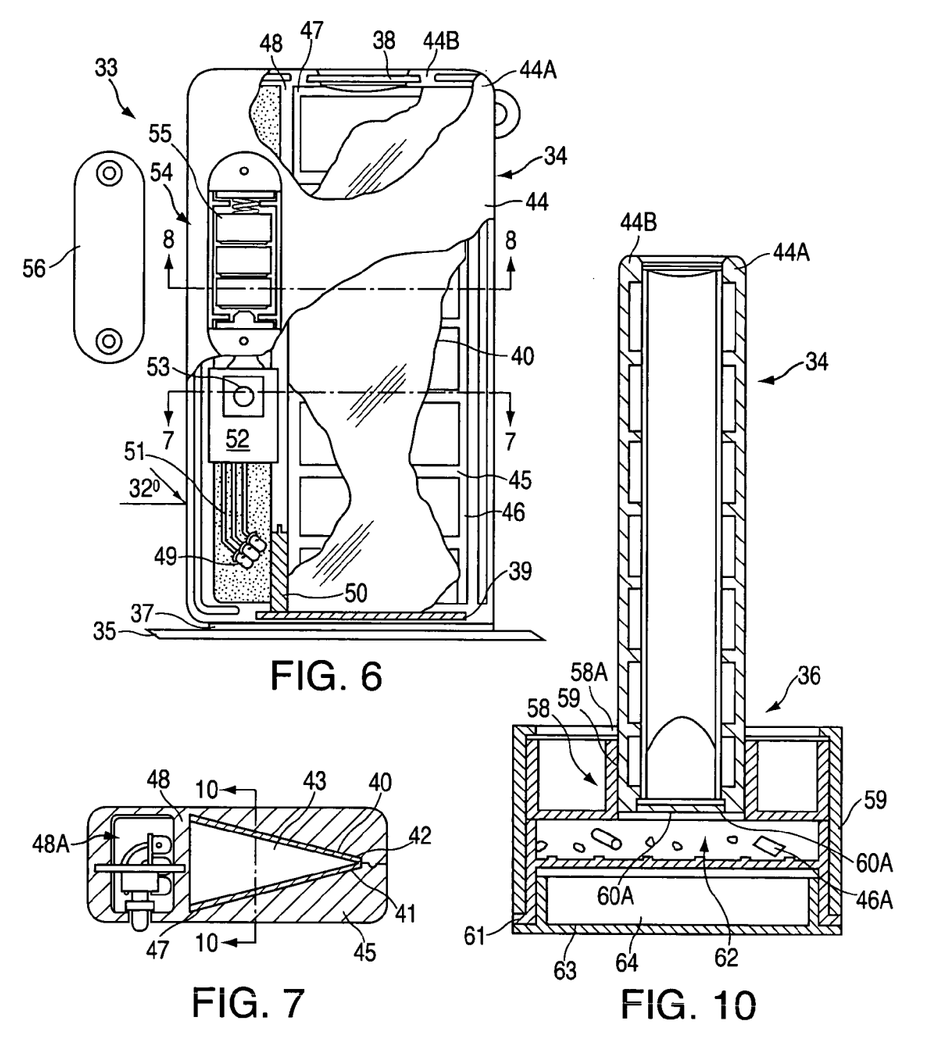
FIG. 6 is a partial cross sectional side elevation view of a second embodiment of a kaleidoscope of the present invention.
FIG. 7 is a cross sectional view, taken along line 7—7 in FIG. 6 of the kaleidoscope of FIG. 6 looking posterior.
FIG. 10 is a cross sectional view, taken along line 10—10 in FIG. 7, of the kaleidoscope of FIG. 6 mounted to an optional fill chamber assembly.
Figure 8:
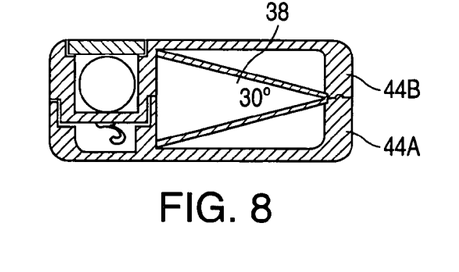
FIG. 8 is a cross sectional view, taken along 8—8 in FIG. 6, of the kaleidoscope of FIG. 6 looking anterior.
Figure 9:
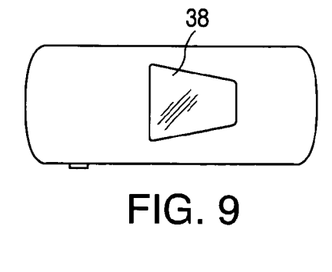
FIG. 9 is a top plan view of the kaleidoscope of FIG. 6.

FIG. 6 illustrates a two-mirror kaleidoscope 33 that also functions as a teleidoscope 34, that is a kaleidoscope that is used to observe scenes in the outer independent world such as flat stock 35 rather than fill objects. FIG. 10 illustrates the kaleidoscope of FIG. 6 press fit to the rotatable fill chamber assembly 36 to form a more typical kaleidoscope that observes on board fill objects 36a rather than an external flat stock 35. Flat stock 35 could be any ready to hand images such as magazine covers, assorted scraps of paper, or posters. Because the kaleidoscope 33 or 34 is internally lit then pressing the image end of the kaleidoscope onto a flat stock surface 37 will block out ambient light, but will still be illuminated by strictly controlled LED illumination.

The teleidoscope 34 is comprised of a positive focusing lens 38 for focusing past the transparent window 39 on images presented near the bottom end. Two rectangular mirrors 40 and 41 are joined along one common edge 42 at a 30-degree angle to form the mirror chamber 43 that generates a radially symmetrical five point star pattern from fill 36a or flat stock material 35 under observation.

The main body 44 is comprised of two body parts 44A and 44B that comprise the two halves of the main body 44. Various grooves in these two parts allow for the capture of all the internal elements of the kaleidoscope 33 or 34 thus aiding in easy assembly of the kaleidoscope 33 or 34. The body parts 44A and 44B of the main body 44 are further comprised of support and wall dividers to accommodate the internal elements. Frame struts 45 and frame edges 46 and 47 hold the two mirrors 40 and 41 in accurate relationship to each other. The border wall 48 completes the isolation of the mirror chamber 43, and separates the mirror chamber 43 from the illumination sub-assembly 48A.

The single LED and/or LED array 49 comprised of RGB LEDs for instance generates light that is diffused through the diffusion window 50 which is comprised of a milky translucent material, or a transparent material with a diffused surface. This light then passes through the bottom transparent window 39 to illuminate fill 36A or flat stock 35 external to the kaleidoscope 33 or 34. The reflection in the bottom window 39 of the diffusion window 50 is visible to the viewer, forms a pleasing border or frame to the radially symmetrical image formed in the kaleidoscope 33 or 34.

Figure 1:
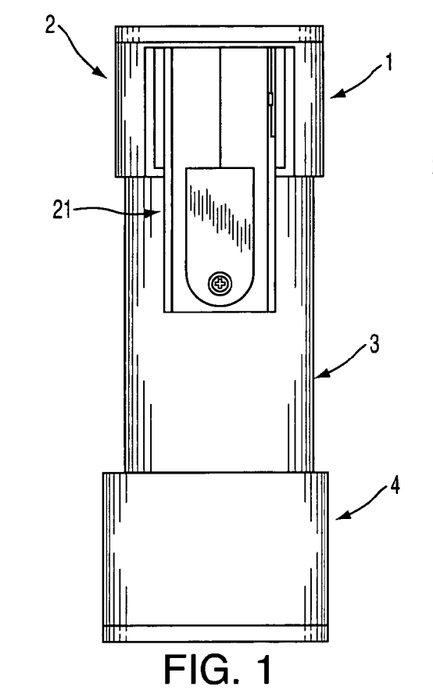
FIG. 1 is a side elevation view of a first embodiment of a kaleidoscope of the present invention.

The illumination source for the kaleidoscope 33 or 34 is almost identical to the one used in the kaleidoscope 1 of FIG. 1 and discussions pertaining to functions and combinations of LED 23 pertain here as well. Again the LEDs 49 are connected via wires 51 to a driver chip 52 a push button switch 53 selects function, and a battery pack 54 with three batteries 55 yielding 4.5 volts DC provides the illumination means.

Figure 11:
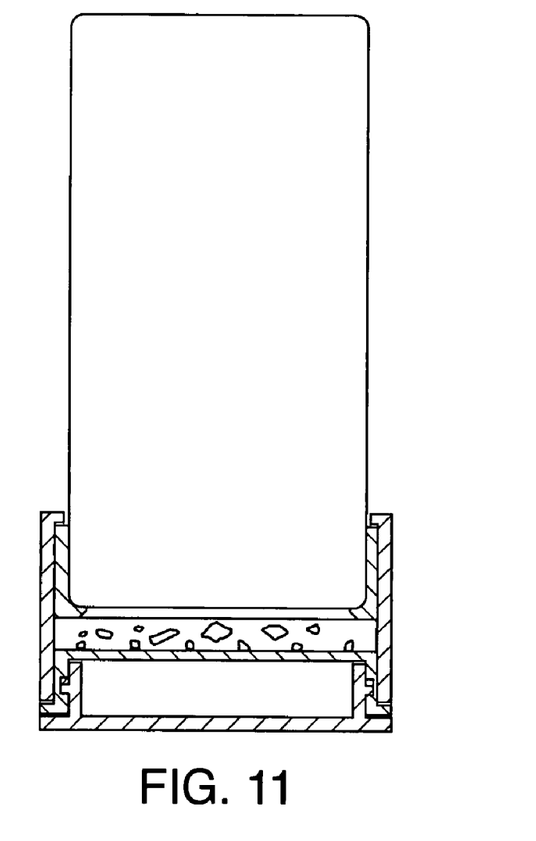
FIG. 11 is a partial cross sectional front view of the kaleidoscope of FIG. 6.
Figure 12:
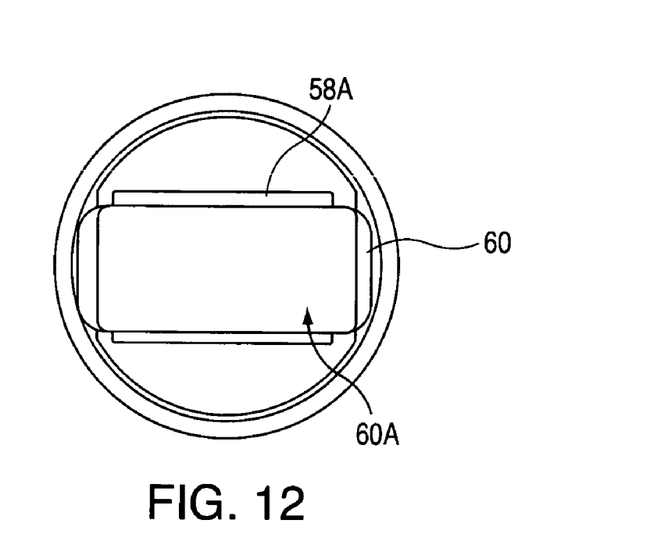
FIG. 12 is a top plan view of the optional fill chamber assembly of FIG. 10.

FIGS. 10, 11, and 12 illustrate the kaleidoscope 34 rather than the teleidoscope 33 configuration in which the main body 44 is press fit to the main fill chamber assembly support structure 58 at 57 by means of press fit support tabs 58A. The rotatable fill cylinder 59 is rotatable about the support flange 58B of the main fill chamber assembly support structure. This structure as seen in FIG. 12 shows that the main kaleidoscope 34 fits into a largely empty hole 60A but is prevented from sliding through by ledges 60. The bottom fill cap 61 is press fit to the rotatable fill cylinder 59 forming the fill chamber 62. The second press fit storage cap 63 forms a storage compartment 64 for storing extra fill materials for future use.

In a third embodiment of the kaleidoscope of the present invention, and as shown for illustration in FIGS. 13–15, the kaleidoscope of FIGS. 6–12 is provided with the RGB array placed along an edge of the mirror chamber below the transparent fill chamber cover plate, thus illuminating the fill chamber with an extreme side light. Both of these side lighting configurations add richness to the fill particles by the shadow casting of the fill particles in this type of illumination. It is an additional purpose of these two configurations of the kaleidoscope of FIGS. 6–15 to create a kaleidoscope that is more open-ended than a traditional kaleidoscope by means of being able to optionally dispense with the traditional fill chamber and allow the kaleidoscope to come in contact with ordinary flat stock such as magazine covers, photographs, psychedelic posters, and other ready-to-hand images to turn these into traditional multiplexed kaleidoscope images that change as one slides the kaleidoscope over them. Since the illumination comes from within the kaleidoscope, then the ready-to-hand images are well illuminated even with the kaleidoscope end flush with the flat stock. A traditional kaleidoscope would block out all light from this image source unless the kaleidoscope was held so far away from the image source that it would lose coherent symmetry. In addition, the LED array having several configuration options from single color, to color mix, to several sequential blinking options gives these mundane images, already elevated by the mirror multiplexing, a startling richness, and unexpected novelty.

Figure 13:
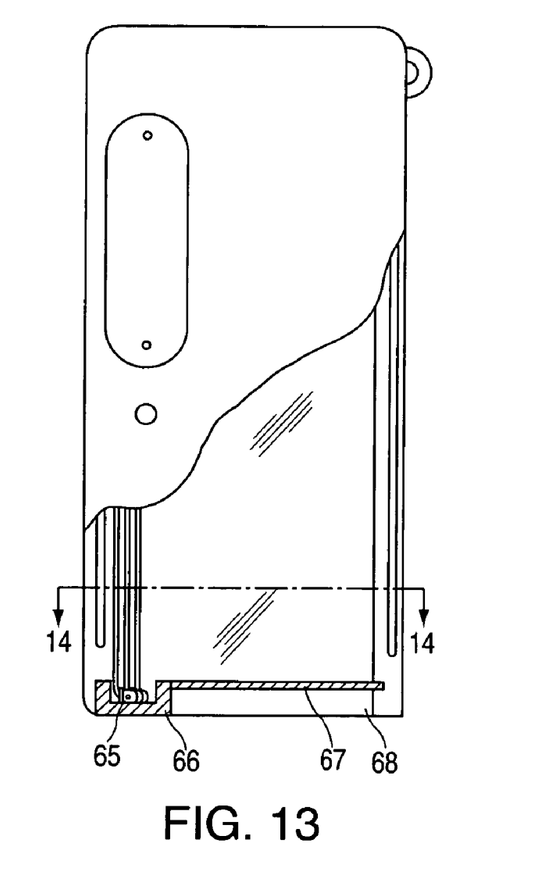
FIG. 13 is a partial cross sectional view of a third embodiment of a kaleidoscope of the present invention.
Figure 14:
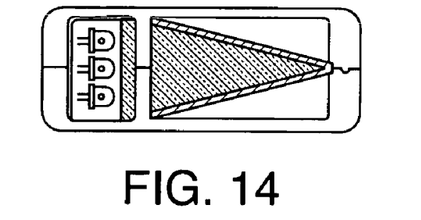
FIG. 14 is a cross sectional view, taken along line 14—14 in FIG. 13, of the kaleidoscope of FIG. 13.
Figure 15:
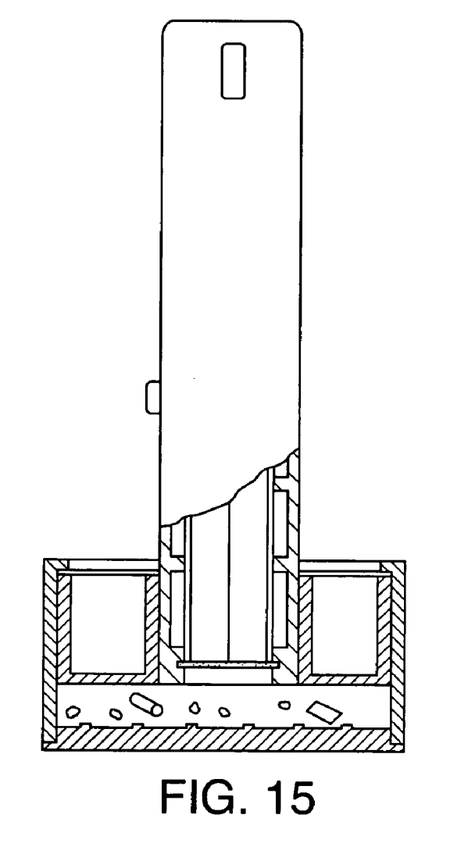
FIG. 15 is a partial cross sectional view of the kaleidoscope of FIG. 13 with an optional fill chamber assembly.
Figure 16:
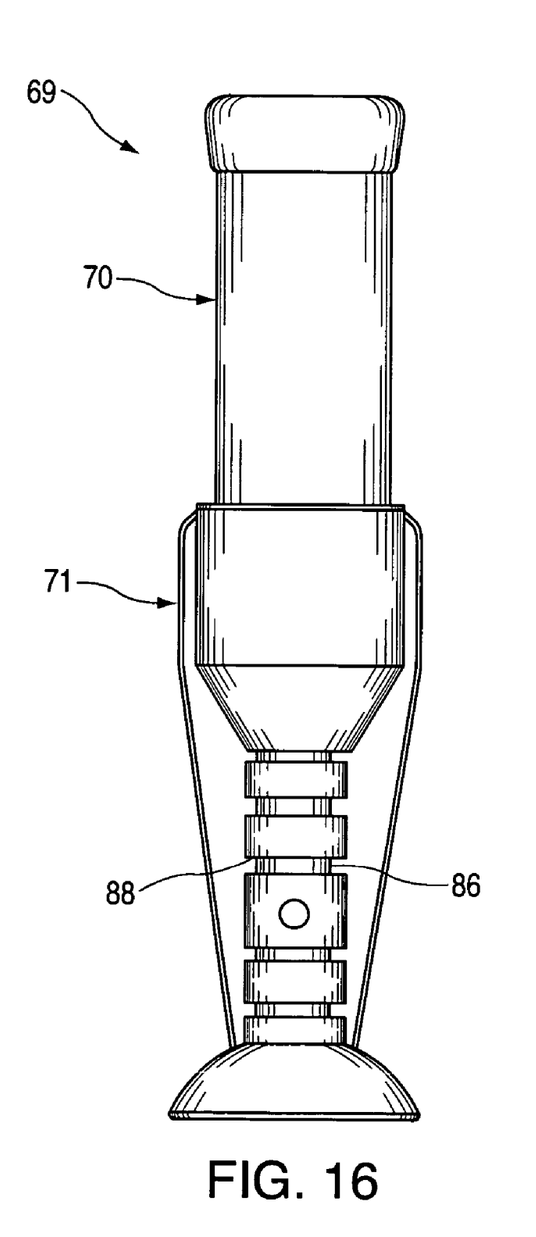
FIG. 16 is a front view of a fourth embodiment of a kaleidoscope of the present invention.
Figure 17:
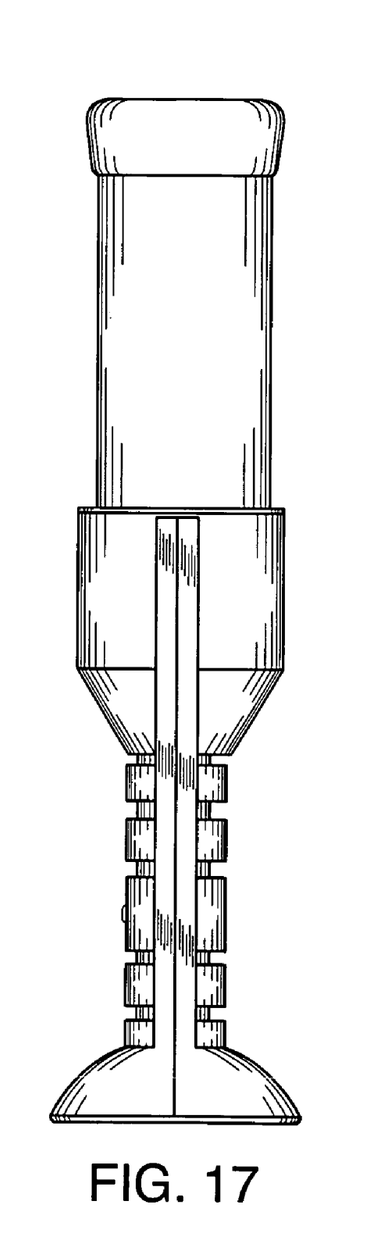
FIG. 17 is a side view of the kaleidoscope of FIG. 16.
Figure 18:
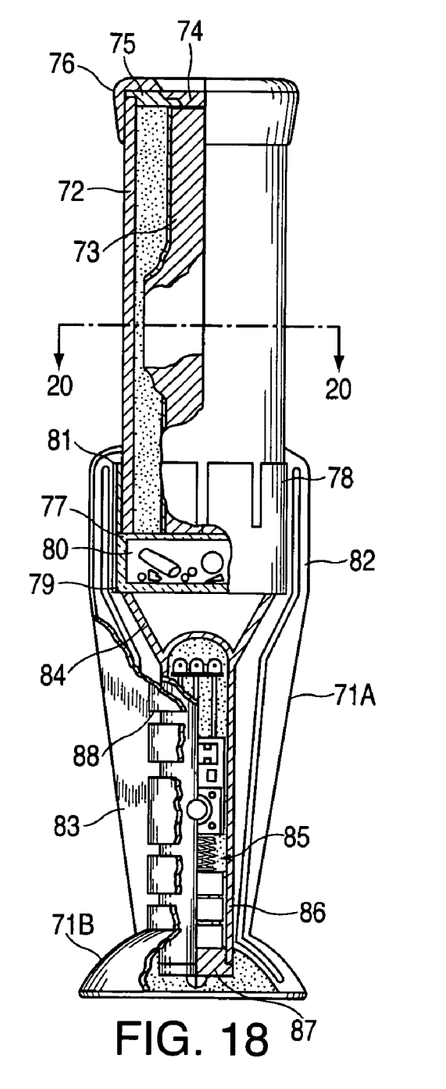
FIG. 18 is a partial cross sectional front view of the kaleidoscope of FIG. 16.
Figure 19:
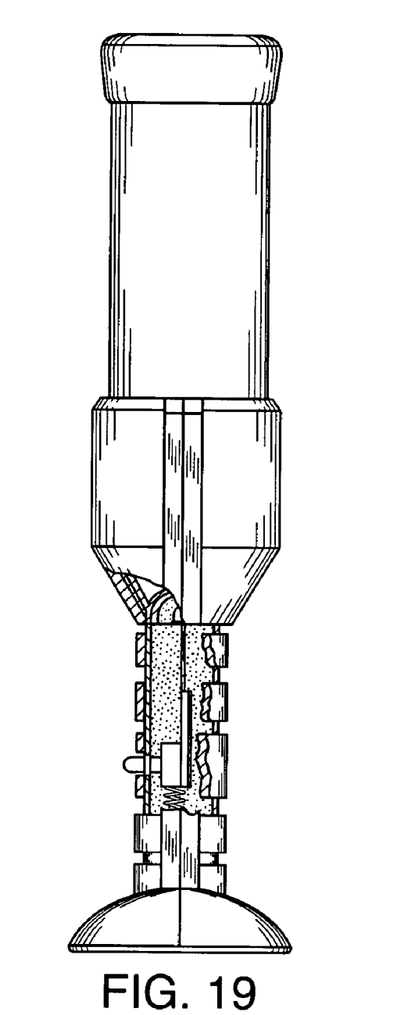
FIG. 19 is a partial cross sectional side view of the kaleidoscope of FIG. 16.
Figure 20:
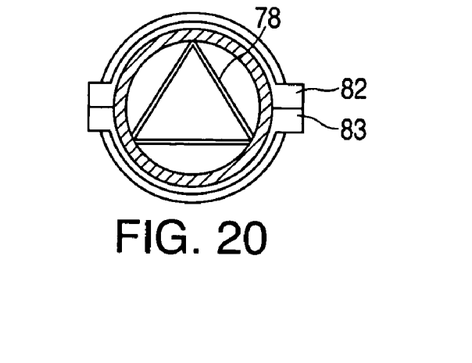
FIG. 20 is a cross sectional view taken along line 20—20 in FIG. 18 of the kaleidoscope of FIG. 16.

FIGS. 13, 14, and 15 illustrate a kaleidoscope similar to the kaleidoscope 34 of FIG. 6. The difference is in the placement of the LEDs 65 seen here illuminating a diffuser 66 that is placed below the transparent window 67 forming an external illumination space 68. The advantage of this is that the illumination source 65 is eliminated from the image of the kaleidoscope as the transparent window 67 is above the illumination source 65 eliminating reflections back to the viewer. In addition, the extreme side angle of the illumination source 65 causes interesting shadow casting effects in the fill chamber or on any uneven layer of flat stock 35.

In a fourth embodiment of the kaleidoscope of the present invention, and as shown for illustration in FIGS. 16–20, the kaleidoscope is illuminated from a position directly posterior to the fill chamber beaming up towards the eyepiece but diffused, creating a back lighting effect in illuminating the fill chamber. The fill particles are in this case made of translucent or transparent particles containing either conventional colored pigments or dyes, or fluorescent and/or phosphorescent dyes or pigments. The use of back lighting requires the fill to be transparent or translucent whereas in the previous mentioned kaleidoscopes the fill can be opaque since the illumination is largely frontal.

FIGS. 16–20 illustrate an LED illuminated kaleidoscope 69 that is lit from the back side of the fill chamber. It is comprised of a kaleidoscope proper 70 rotatable mounted to a lamp housing 71. The kaleidoscope proper 70 is comprised of a main barrel 72 housing three mirrors 73 with a focusing lens 74 mounted to the barrel by means of an inner end cap 75 and an outer end cap 76. At the other end of the kaleidoscope 69, a circular transparent window 77 is captured by the bottom end cap 78 comprised of a milky translucent plastic material 79 and forming the fill chamber 80. The flange 81 of the lamp base 71 captures the rotatable kaleidoscope 69 and prevents its removal from the lamp base 71. The lamp base 71 is comprised of two halves 82 and 83 and when they are glued or screwed together, they capture the kaleidoscope 69 and the LED lamp elements 85. The LEDs 85 illuminate a primary diffuser 84 comprised of a milky plastic that then illuminates the bottom end cap 78 thus a double diffusion takes place giving the back light an even distribution.

The light source is simply an embedded off the shelf multi-function multi-color LED penlight 85. The metal body of the penlight 86 is caped with a metal screw cap 87 for changing the batteries. Heat from the LEDs is dissipated through the metal body to the air through the lamp housing louvers 88.

Figure 21:
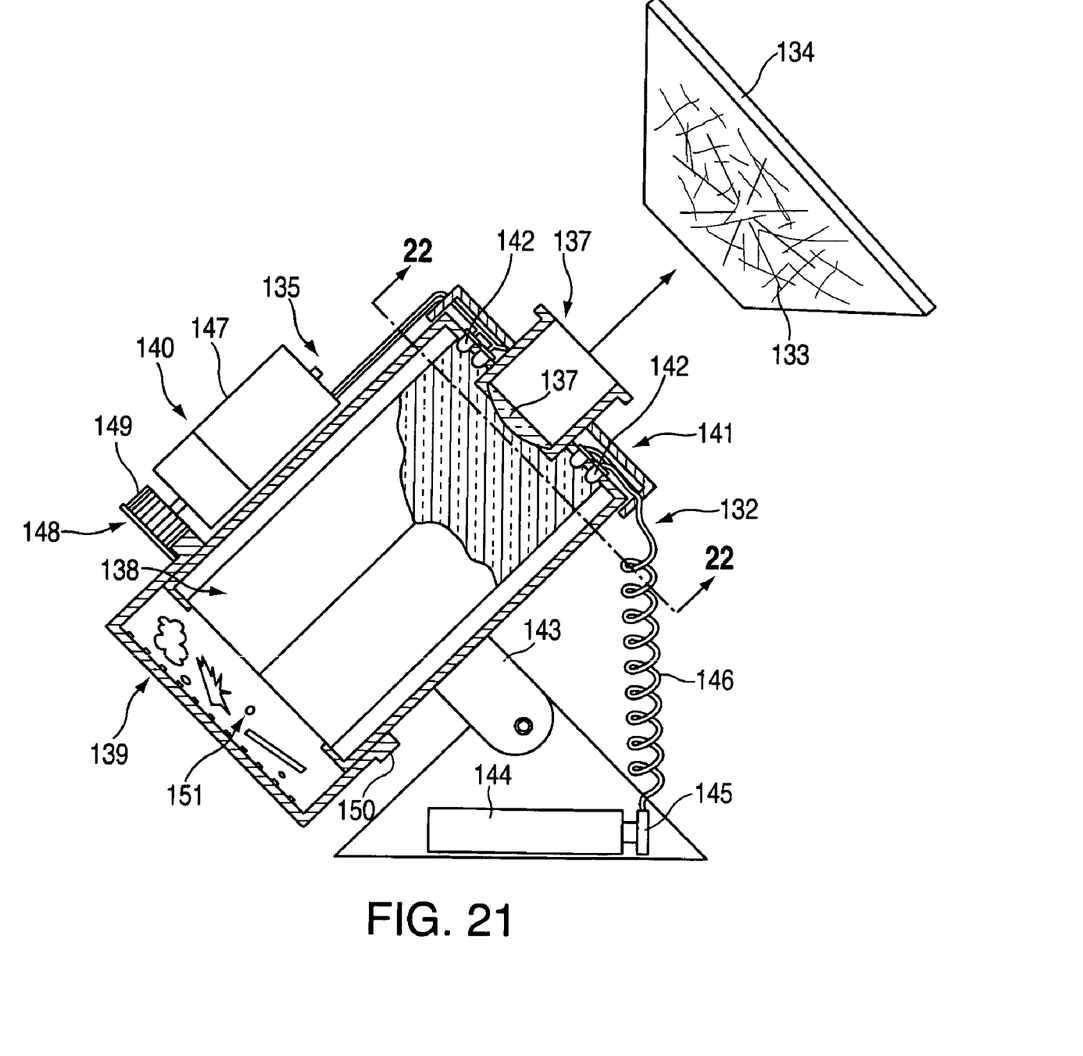
FIG. 21 is a cross sectional view of a fifth embodiment of a kaleidoscope of the present invention.
Figure 22:
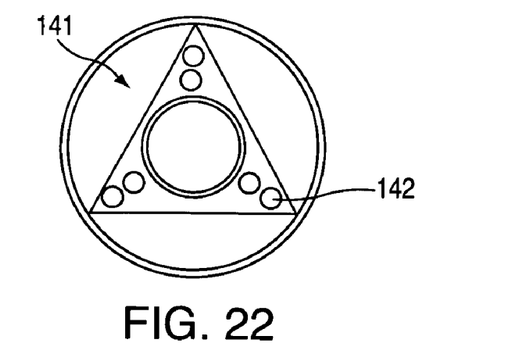
FIG. 22 is a cross sectional view taken along line 22—22 of FIG. 21 of the kaleidoscope of FIG. 21.

In a fifth embodiment of the kaleidoscope device of the present invention, and as shown by way of illustration in FIGS. 21 and 22, the kaleidoscope is in the form of a kaleidoscope projector 132 projecting an image 133 on a screen 134 or adjacent wall. The projector is comprised of the main body 135 and a base 136. The main body 135 is comprised of an adjustable projector lens 137, a typical kaleidoscope three mirror set 138 and an opaque rotatable fill module 139 which is slowly rotated continuously by electric motor means 140. The anterior end cap 141 houses six UV or white light LEDs 142 within the confines of the mirror chamber, the combined light of which is sufficient to illuminate the fill 151 so strongly that light from the fill is visible as an external projected image 133.

The main body 135 is tiltably mounted to the base 136 at 143. The base 136 holds batteries 144 and is wired to the LED 142 via resistor 145 and multi-stranded power cable 146 that also powers the fill rotation motor 147, with reduction gear box 148 to slowly rotate the fill module 139 by means of drive gear 149 and ring gear 150. Again, the fill 151 is energized to emit light if it is fluorescent and/or phosphorescent and the LEDs 142 are UV. If the LEDs 142 are white light, then the fill 151 may be comprised as above or comprised of standard colored or reflective materials.

Figure 23:
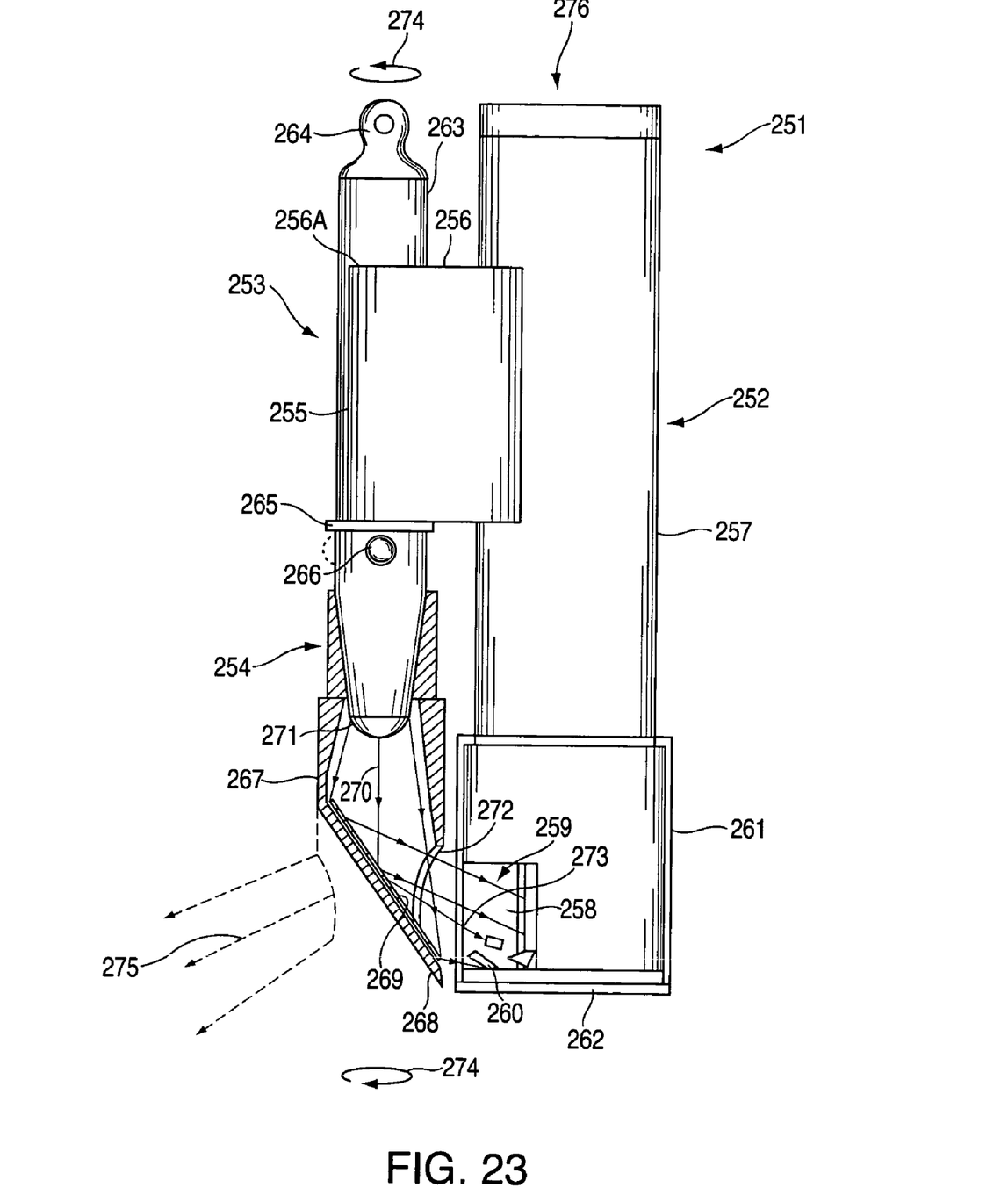
FIG. 23 is a partial cross sectional side view of a sixth embodiment of a kaleidoscope of the present invention.

In a sixth embodiment of the kaleidoscope of the present invention, and as shown in FIG. 23 for illustrative purposes, the kaleidoscope is in the form a key chain LED illuminated kaleidoscope 251. The kaleidoscope is comprised of kaleidoscope 252, a typical LED light pen 253 capped with mirror adaptor 254, and a connecting and mounting means 255 which is permanently affixed to the kaleidoscope body at 256 and tightly but rotatably holds the pen light 253 at 256a. The kaleidoscope body 257 flares slightly at the bottom to form an opaque fill chamber 258 with an open side window 259 with fill 260. A transparent and rotatable fill cylinder 261 comprised of transparent plastic material, in combination with a press fit opaque bottom cap 262, complete the kaleidoscope.

The pen light body 263 is capped with a key chain "D" ring 264. A body ring 265 prevents the pen 253 from slipping out of the connector 255 allowing the light pen 253 to rotate without slipping out. Thus, the whole unit, including the kaleidoscope 251, can be carried on a chain. The penlight 253 has an "on-off" button 266.

The mirror adapter 254 is comprised of an opaque housing 267 and a slanted mirror mounting plate 268 with an affixed plastic mirror 269 that reflects light 270 from the LED 271 through the mirror adapter housing at port 272 as redirected light 273 into the fill chamber 258. Rotating the penlight as shown by arrow 274 redirects the light beam 275 away from the kaleidoscope 251 for use as a typical light source.

Again, as with all the other kaleidoscopes mentioned, if the LED 271 is UV, then the fill 260 can be fluorescent or phosphorescent and if the LED 271 is a white light LED, then the fill 260 can be made of anything colorful or reflective.

In a seventh embodiment of the kaleidoscope device of the present invention, and as shown by way of illustration in FIGS. 24–27, the kaleidoscope is in the form of a two mirror kaleidoscope 301 comprised of a housing 302 further divided into the main body 303 and the battery holder 304. One rectangular mirror 305 and a nearly identical mirror 306 are joined along a common side at apex 307 (see FIG. 26) in this case at a 22.5-degree angle 323 (see FIG. 27) forming a radially symmetrical eight-pointed image 324, 325.

Figure 24:
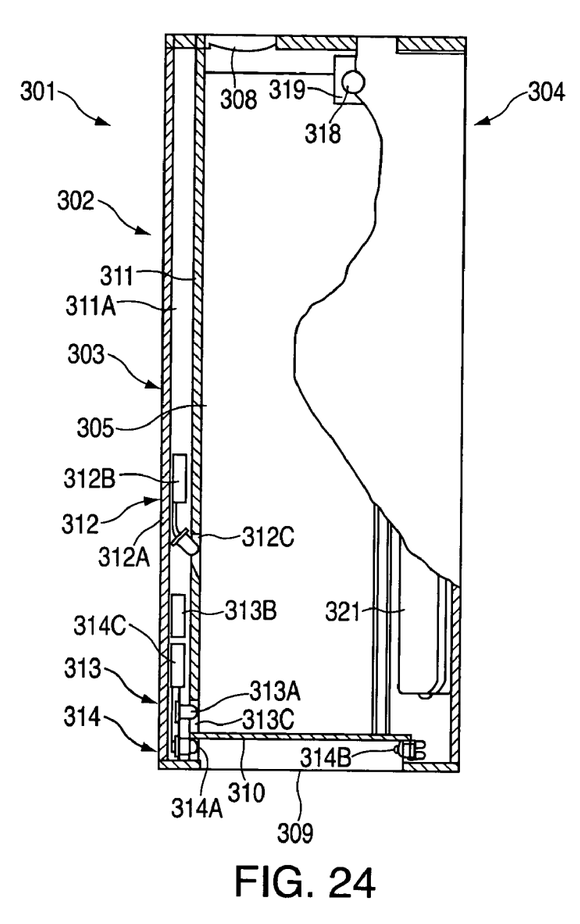
FIG. 24 is a partial cross sectional side view of a seventh embodiment of a kaleidoscope of the present invention.
Figure 25:
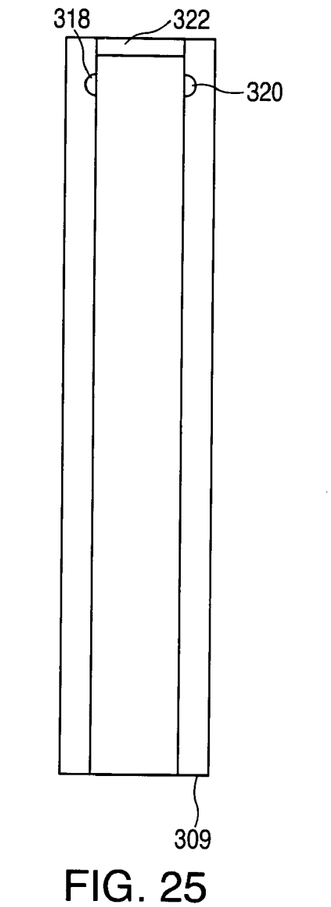
FIG. 25 is a front view of the kaleidoscope of FIG. 24.
Figure 26:
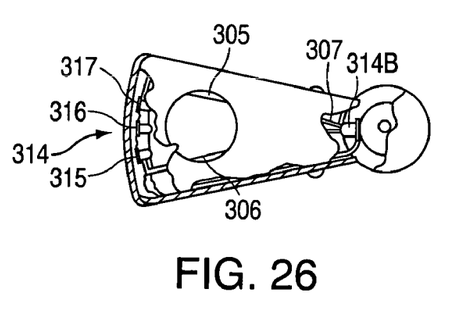
FIG. 26 is a partial cross sectional top view of the kaleidoscope of FIG. 24.
Figure 27:
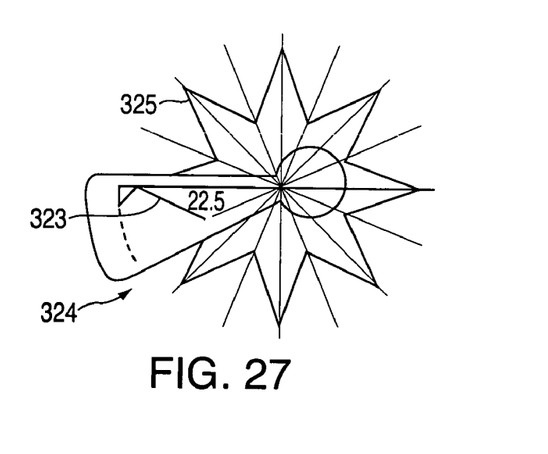
FIG. 27 is a diagram of the appearance of a kaleidoscopic image generated by the kaleidoscope of FIG. 24.

A focusing lens 308 focuses on the image plane 309 through a transparent window 310. A framing wall 311 defines the border of the mirror chamber and forms an LED housing space 311A that runs the length of the kaleidoscope. Three LED array locations are present at different levels. Each array comprises at least three LEDs (red, green, blue, that is RGB for instance). The upper level array or lamp location 312 comprises three LEDs (RGB) 312A connected to the sequencing chip 312B and beaming out of LED port 312C and roughly at a 45-degree angle illuminating the image plane 309 below.

A second lamp location 313 is just above the transparent window 310 and comprises three LEDs (RGB) 31 3A connected to sequencing chip 313B beaming out of LED port 313C at roughly a 25-degree angle. This location creates some shadowing effects upon loose or rough fill objects.

The third lamp location 314 is set below the transparent window 310 and nearly flush with the image plane 309. This location eliminates any reflections of the LED array because it is below the transparent window 310. This location differs from the other two by being below the transparent window 310 and by having a fourth LED in the array. Thus, there are the usual three LEDs (RGB) 314A plus a single LED 314B located beyond the apex of the mirrors. This LED could be either an ultra violet LED or a yellow LED for instance. All four of the LEDs are run by sequencing chip 314C. A clearer view of this last array can be seen in FIG. 26 with a red LED 315, a green LED 316, a blue LED 317, and the yellow or violet LED 314B.

A selector button 318 activates a selector switch 319 that selects which lamp location is to be active and illuminating. The second simple on off button switch 320 (FIG. 25) must be depressed to keep the selected lamp location on. This prevents leaving the kaleidoscope on when not in use that would quickly use up the batteries. The battery holder 304 holds three AAA batteries 321 supplying 4.5 volts to the illumination system and is capped by 322. Chip sets, battery connections, and switches are off the shelf and common to the trade.

As stated previously, a kaleidoscope needs only one of the lamp locations illustrated to be a self-illuminating kaleidoscope.

Figure 28:
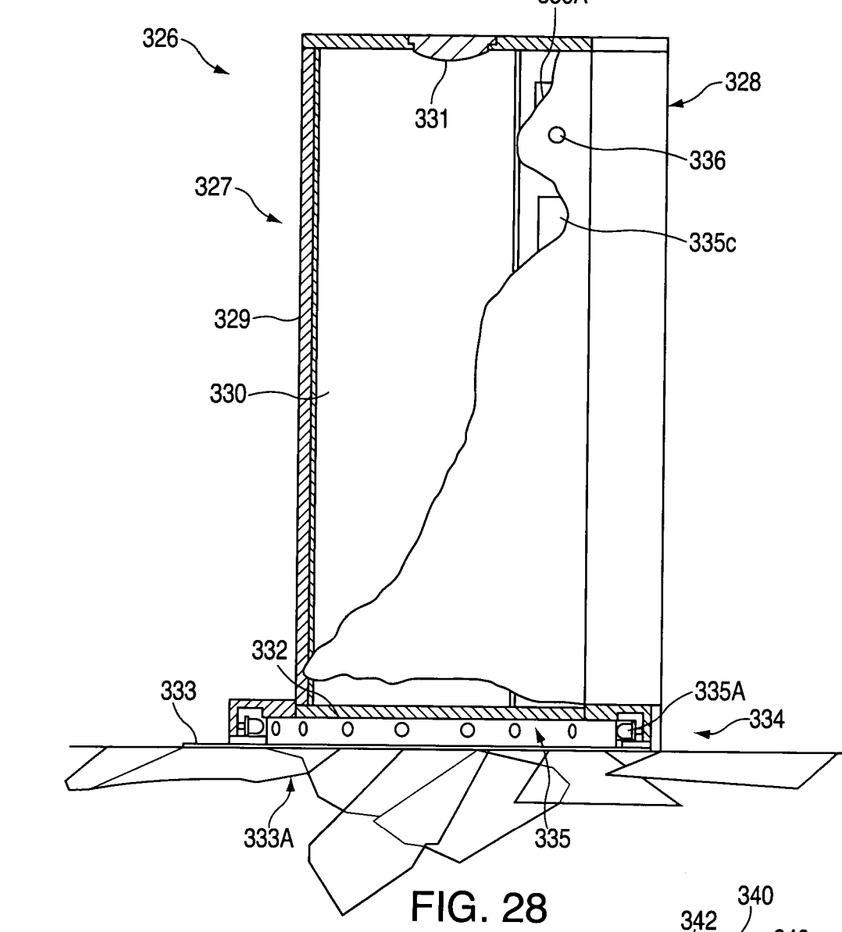
FIG. 28 is a partial cross sectional side view of an eighth embodiment of a kaleidoscope of the present invention.
Figure 29:
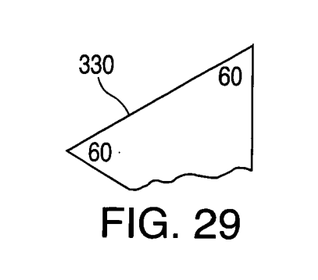
FIG. 29 is a top plan view illustrating the three-mirror arrangement in the kaleidoscope of FIG. 28.

In an eighth embodiment of the kaleidoscope of the present invention, and as shown in FIGS. 28 and 29 for illustration, the kaleidoscope is in the form of a three-mirror kaleidoscope 326 with main body 327 and battery holder 328. The main body is a cylinder 329 holding three identical rectangular mirrors 330 yielding a boundless tiling imagery.

A focusing lens 331 focuses through a clear window 332 to the image plane 333. The plane 333 may contain colored flat stock 333A upon a tabletop surface, for instance. The kaleidoscope base 334 is shown flush up against the image plane and the kaleidoscope 326 is slidable upon it. The base 334 contains an LED array 335 circumferentially placed about the inner edge of the base 334, 335A being one of 15 LEDs in this array. The array 335 illuminates the image plane 333 with three sets of red, green, and blue LEDs 335 for instance. The LEDs 335 are sequentially controlled by circuit chip 335C with the sequence selection button 336 and switch 336a.

Figure 30:
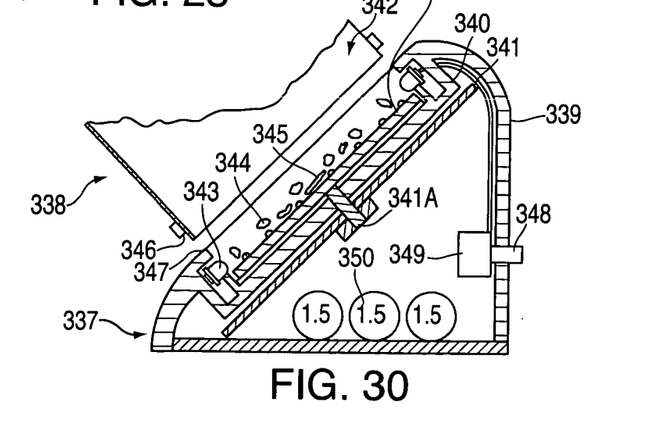
FIG. 30 is a cross sectional view of a LED illuminated fill base for use with a non-internally illuminated kaleidoscope.

FIG. 30 illustrates an independent LED illuminated fill base 337 upon which a non-illuminated kaleidoscope 338 may be held. The body of the base 339 contains a tilted rotatable fill disk 340 connected by shaft 341A and activated by the rotation disk 341 that protrudes from the base 339 for hand operation. The rim of the fill chamber 340 has a typical LED array 342 (as described in previous figures) of LEDs 343 of various colors that illuminate in various sequential combinations for various lighting effects. The fill chamber 340 contains various flat stock 345 and other particles 344 which makes up the image source for the kaleidoscope 338. The kaleidoscope 338 fits snuggly over the fill chamber at 346 and 347. A selector button 348 and sequence controller chip 349 controls the LED array 342. Three AAA batteries 350 supply 4.5 volts for the LED array 342.

In a ninth embodiment, the kaleidoscope device of the present invention for viewing kaleidoscopic images of at least one imaging object may also comprise a viewing assembly for viewing the imaging object, a fill chamber assembly, a main body connecting the viewing assembly and the fill chamber assembly and a black light-generating means disposed in the device for illuminating the imaging object with light of a selected wavelength.

The present invention is applicable to most typical kaleidoscope designs but is embodied here in a preferred embodiment in a two-mirror design that allows for the brightest illumination. It is thus applicable to two, three, or four mirror kaleidoscopes of any size, from key chain to binocular kaleidoscopes in which the kaleidoscopes are large enough for meaningful two-eye viewing.

As may be seen, for illustrative purposes, in the accompanying FIGS. 31 through 34, the kaleidoscope 401 of the present invention comprises a cylindrical main body 402, a focusing lens 403 disposed at, and attached to, the anterior, or proximal, end of the main body 402 through which to view the kaleidoscopic image, a mirror set 404 comprised of a plurality of mirrors, such as a first mirror 405 and a second mirror 406, joined to a next adjacent mirror along one common mirror side 407, thereby forming, and defining, an image multiplying chamber 408, and a port or primary image chamber housing 409 disposed at, and affixed to, the other, or distal, end of the main body 402, creating a fill chamber 409a.

Figure 31:
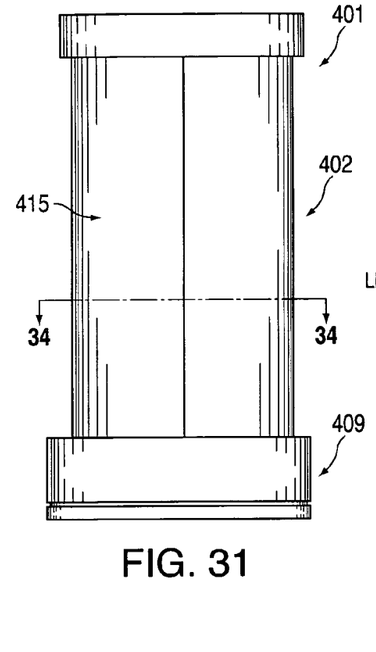
FIG. 31 is a side view of a ninth embodiment of a kaleidoscope of the present invention.
Figure 32:
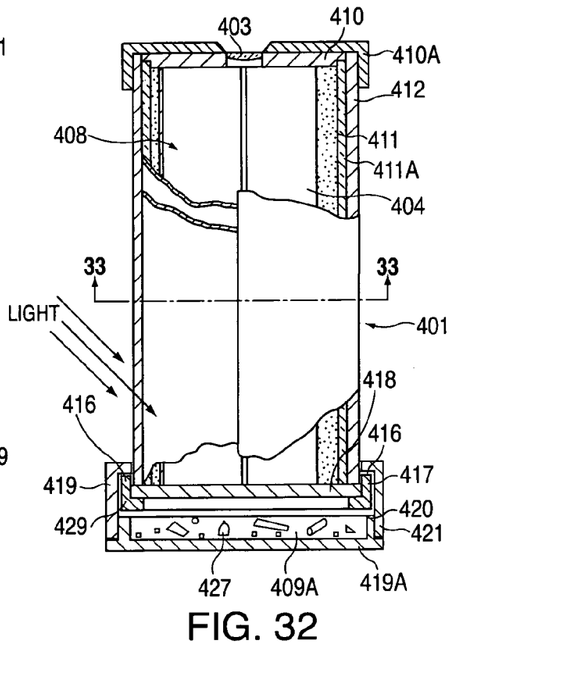
FIG. 32 is a partial cross sectional side view of the kaleidoscope of FIG. 31.
Figure 33:
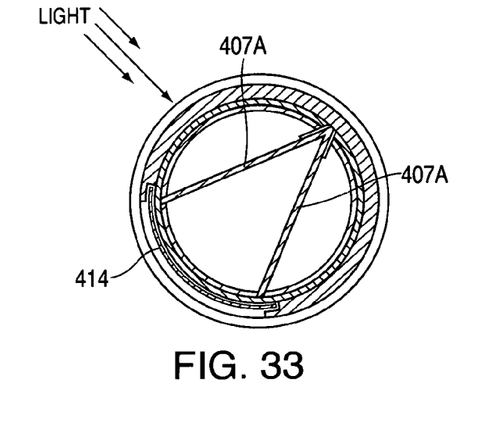
FIG. 33 is a cross sectional view taken along line 33—33 of FIG. 32, of the kaleidoscope of FIG. 31.
Figure 34:
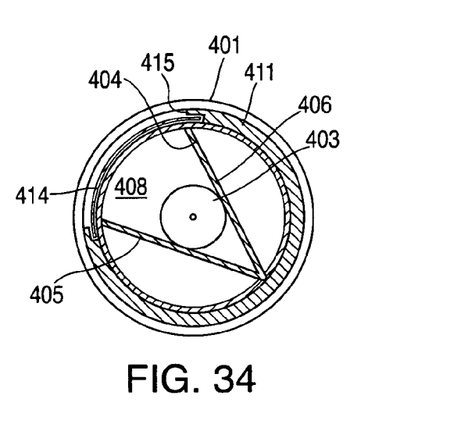
FIG. 34 is a cross sectional view taken along line 34—34 of FIG. 32, of the kaleidoscope of FIG. 31.

The cylindrical main body 402 is comprised of an opaque lens mounting plate 410 disposed at, and occluding, the proximal end of the cylindrical main body 402 and an end cap 410A holding the focusing lens 403 and joined to a transparent cylinder 411. The transparent cylinder 411, in a preferred embodiment, is made of a transparent plastic or glass that is efficiently capable of transmitting UV light. An acrylic polymer can be made pure enough to do so, witness acrylic polymer used as UV ports for indoor tanning equipment, and polycarbonate polymers can be made quite UV-transitive. The material of the transparent cylinder 411 may also be mixed with suitable dyes or pigment particles to form a deep blue light transmissive filter 411a.

Partially surrounding the transparent cylinder 411 is an opaque framing member 412 that leaves an open transparent area, such as a window area or aperture 413, of the cylinder 411, preferably, running the length of the main body 402. This area 413 is placed to coincide with the open area between the two mirrors 405 and 406. Thus, a clear window area 413 runs the length of the kaleidoscope body 402 that establishes the ingress of ambient light for use in the illumination of the illuminating objects to be observed in the fill chamber 409a. Most importantly is the placement of a transparent, but deep blue or violet filter sheet 414 running the entire length of the window 413 and held in place by grooves 415 on both sides of the framing member 412. Optimally, this light filter (such as a theatrical type filter material of extremely high saturation) allows ideally only ultra-violet, visible violet, and visible blue light ("black light" in the popular sense) through for use in the illumination of the illuminating objects to be observed in the fill chamber 409a. The filter sheet 414 is further framed in and retained in place by a groove 416 in the upper fill chamber housing member 417. This member 417 may be made of a blue or violet transparent plastic, as may all elements of the image chamber housing 409. This upper housing member 417 is either made of an opaque plastic to occlude all light, or of a transparent UV-transmitting plastic that again allows only "black light" through. The net result is to only allow "black light" to illuminate the objects to be viewed, and to eliminate all other white light from the fill chamber 409a and the mirrors 405 and 406 in the main body 402. The only remaining potential source of white light contamination would be from the viewing port and the eye of the person viewing the image blocks this.

In an alternative preferred embodiment, the amount of filtered "black light" can be increased by replacing the UV filter sheet 414 with a transparent fluorescent sheet 414a (not shown) that is saturated with blue fluorescing dye or pigment particles and using this transparent fluorescent sheet 414a in combination with a deeply blue filtering cylinder 411a (not shown). What happens in this alternative embodiment is that the upper spectrum of the incident white light fluoresces as blue light in the outer filter layer 414a before being filtered by the inner filter 411a. Thus, there is a net gain of "black light" over simply filtering the incident ambient light to transmit filtered black light.

The upper fill chamber housing member 419 retains the clear circular chamber window 418 in place and prevents the mirrors 405 and 406 from falling down into the primary fill chamber. Press-fit to the upper rotatable fill chamber housing member 419 is an end cap 419a that is opaque black as contrasted with the other elements of the image chamber housing 409 that are violet- or blue light-transmissive. It may be either opaque or "black light" transmissive. It is joined in a tapered press fit manner at 420 with a release groove 421 to allow the manual opening of the fill chamber 409a. (So as not to lose the end cap when the chamber is open, it may be attached by a cord to the upper fill chamber housing member 419, such as by means of "D" rings (not shown).

With the fill chamber 409a open, various objects 427 to be viewed may be placed in the chamber 409a and then closed. To take full advantage of the unique "black light" illumination, the objects would be made of, or coated with, fluorescent and or phosphorescent material.

The objects 427 when sealed in the fill chamber 409a will be solely illuminated by "black light" and will fluoresce or glow in their characteristic colors due to excitation from the "black light." The objects may either be three dimensional, such as sculpture 427, or be two dimensional, such as flat stock. (If sculpture, they may be permitted to intrude up into the mirror chamber.) The objects are, of course, multiplied into radially symmetric patterns by means of the mirrors into typical kaleidoscope art. However, they retain an original and characteristic quality of black light art because of their illumination by near ultra violet light.

The angle between mirrors 405 and 406 is crucial for forming a coherent kaleidoscopic image and must be an even division of 360 degrees. In the case of two mirrors as exemplified here, the angle 407a (FIG. 34) is 45 degrees and yields an eight facet radially symmetric pattern. With the end cap 419a removed, the kaleidoscope 401 may be placed directly over various fluorescent and/or phosphorescent objects 427 or flat stock as long as the bottom rim 429 of the upper fill chamber housing member 419 is flushed with a flat surface or otherwise occludes ambient light from directly illuminating the objects 427. The kaleidoscope 401, thus held, will seal out white light and operate in a "black light" mode.

The kaleidoscope operates optimally indoors under fluorescent lights or halogen lights, both high in UV light, and outdoors during the day in either full sunlight or in overcast conditions. Because it is designed to pass "black light" into the fill chamber 409a, it operates quite well in actual black light environments.

The features of the invention illustrated and described herein is the preferred embodiment. Therefore, it is understood that the appended claims are intended to cover the variations disclosed and unforeseeable embodiments with insubstantial differences that are within the spirit of the claims.

What I claim is:

1. A portable kaleidoscope device for viewing kaleidoscopic images of at least one imaging object, comprising
    a. a viewing assembly adapted to view the imaging object;
    b. a fill chamber assembly adapted to contain the imaging object having a transparent conical cover plate;
    c. a main body connecting said viewing assembly to said fill chamber assembly; and
    d. lighting means disposed in said device adapted to illuminate the imaging object with light of a selected wavelength,
    wherein said conical cover plate minimizes reflections from said lighting means to the viewing assembly.

2. A kaleidoscope device as recited in claim 1 wherein said lighting means is disposed in said main body.

3. A kaleidoscope device as recited in claim 1 wherein said lighting means is disposed in said fill chamber assembly.

4. A kaleidoscope device as recited in claim 1 wherein said lighting means illuminates the imaging object vertically downwardly.

5. A kaleidoscope device as recited in claim 1 wherein said lighting means illuminates the imaging object diagonally downwardly.

6. A kaleidoscope device as recited in claim 1 wherein said lighting means illuminates the imaging object horizontally.

7. A kaleidoscope device as recited in claim 1 wherein said lighting means illuminates the imaging object vertically upwardly.

8. A kaleidoscope device as recited in claim 1 wherein said light of a selected wavelength includes black light.

9. A kaleidoscope device as recited in claim 1 wherein said light of a selected wavelength includes ultra violet light.

10. A kaleidoscope device as recited in claim 1, wherein said light of a selected wavelength includes blue light.

11. A kaleidoscope device as recited in claim 1 wherein said lighting means includes a plurality of light-emitting diodes.

12. A kaleidoscope device as recited in claim 1, wherein said lighting means includes a plurality of light-emitting diodes of different colors.

13. A kaleidoscope device as recited in claim 1, wherein said lighting means includes a plurality of light-emitting diodes that are sequentially controlled.

14. A kaleidoscope device as recited in claim 1, wherein said lighting means includes an array of light-emitting diodes including at least one red light-emitting diode, at least one green light-emitting diode, and at least one blue light-emitting diode.

15. A kaleidoscope device as recited in claim 1, wherein said lighting means includes at least one ultra violet light-emitting diode.

16. A kaleidoscope device as recited in claim 1, wherein said lighting means includes at least two ultra violet light-emitting diodes.

17. A portable kaleidoscope device for viewing kaleidoscopic images of at least one imaging object, comprising
    a. a viewing assembly adapted to view the imaging object;
    b. a fill chamber assembly adapted to contain the imaging object having a transparent conical cover plate;
    c. a main body connecting said viewing assembly to said fill chamber assembly; and
    d. a black light-generating means disposed in said device adapted to illuminate the imaging object with light of a selected wavelength,
    wherein said conical cover plate minimizes reflections from said black light-generating means to the viewing assembly.

18. A kaleidoscope device as recited in claim 17, wherein said black light-generating means comprises a black light-transmissive filter.

19. A kaleidoscope device as recited in claim 17, wherein said black light-generating means comprises an ultra violet light-generating material.

20. A kaleidoscope device as recited in claim 17, wherein said body comprises a mirror multiplying chamber.

21. A kaleidoscope device as recited in claim 20, wherein said mirror multiplying chamber comprises a mirror set of two mirrors attached together along a common edge.

22. A kaleidoscope device as recited in claim 17, wherein said black light generating means comprises at least one ultra violet light-emitting diode.

23. A kaleidoscope device for viewing kaleidoscopic images of at least one imaging object, comprising:
    a. a viewing assembly adapted to view the imaging object;
    b. a fill chamber assembly;
    c. a main body connecting said viewing assembly to said fill chamber assembly, said body comprises an ultra violet light-transmissive cylinder; and
    d. a black light-generating means disposed in said device adapted to illuminate the imaging object with light of a selected wavelength.

24. A kaleidoscope device as recited in claim 23, wherein said body comprises an opaque cylindrical member partially surrounding said cylinder.

25. A kaleidoscope device as recited in claim 23, wherein said cylinder comprises an aperture.

26. A kaleidoscope device for viewing kaleidoscopic images of at least one imaging object, comprising:
   a. a viewing assembly adapted to view the imaging object;
   b. a fill chamber assembly;
   c. a main body connecting said viewing assembly to said fill chamber assembly; and
   d. a black light-generating means comprises a green through red light-filtering material disposed in said device adapted to illuminate the imaging object with light of a selected wavelength.

27. A portable kaleidoscope device for viewing kaleidoscopic images in combination with at least one imaging object, comprising
   a. at least one imaging object;
   b. a viewing assembly for viewing kaleidoscopic images of said imaging object;
   c. a fill chamber assembly adapted to contain the imaging object having a transparent conical cover plate;
   d. a main body connecting said viewing assembly to said fill chamber assembly; and
   e. a black light-generating means disposed in said device adapted to illuminate the imaging object with light of a selected wavelength,
   wherein said conical cover plate minimizes reflections from said black light-generating means to the viewing assembly.

28. A kaleidoscope device as recited in claim 27, wherein said imaging object comprises black light fluorescent object.

29. A kaleidoscope device as recited in claim 27, wherein said imaging object comprises objects that are black light active fluorescent or black light active phosphorescent, or both.

* * * * *